A. REED.
LAND BREAKING PLOW.
APPLICATION FILED JAN. 30, 1914.
1,113,691.
Patented Oct. 13, 1914.
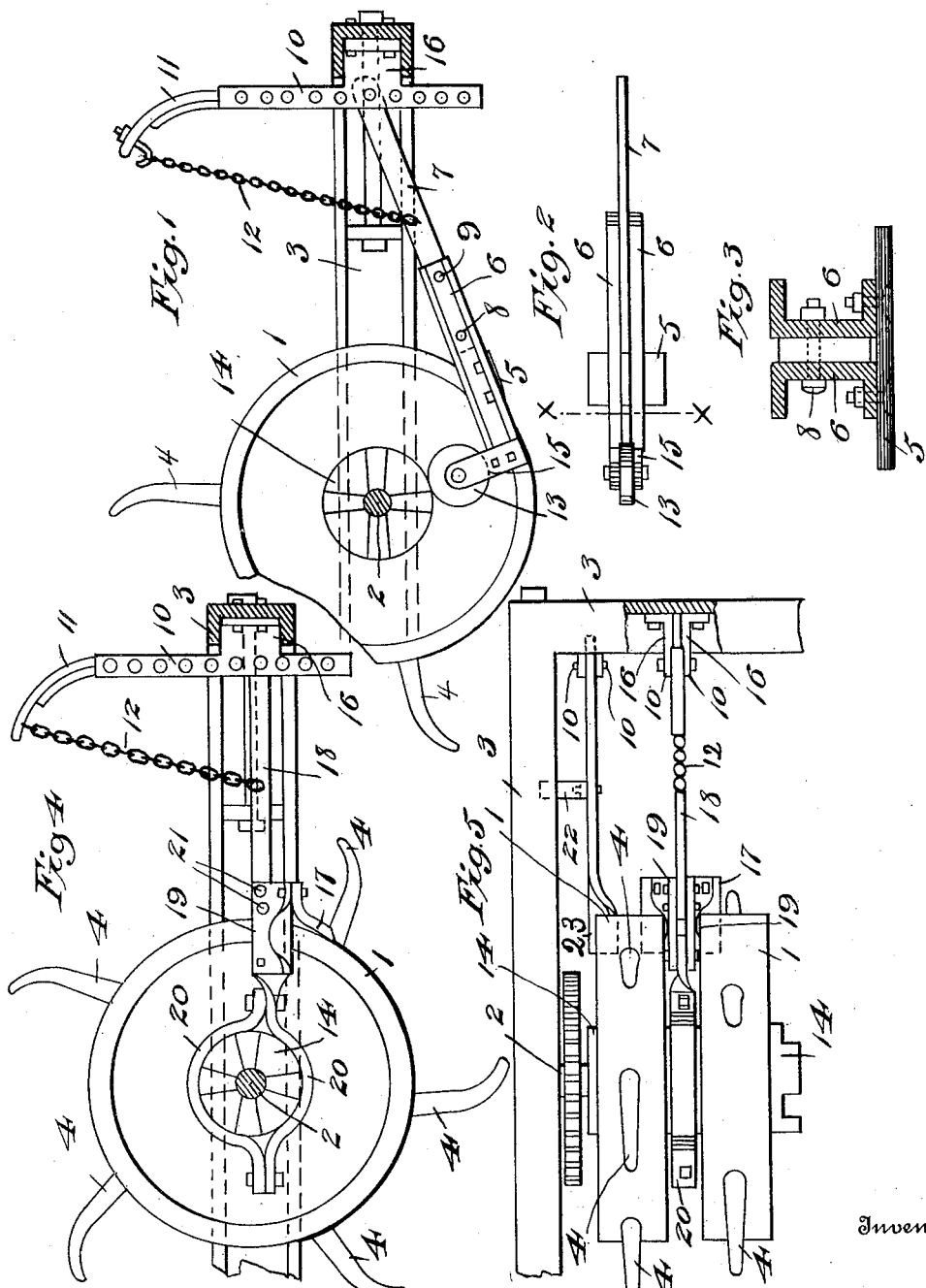
Witnesses
Paul V. Brewer
Jesse F. Curry
Inventor
Arthur Reed,
By A. L. Jackson.
Attorney

UNITED STATES PATENT OFFICE.

ARTHUR REED, OF FORT WORTH, TEXAS, ASSIGNOR TO BENNETT W. REED, OF FORT WORTH, TEXAS.

LAND-BREAKING PLOW.

1,113,691. Specification of Letters Patent. Patented Oct. 13, 1914.

Application filed January 30, 1914. Serial No. 815,384.

*To all whom it may concern:*

Be it known that I, ARTHUR REED, a citizen of the United States, residing at Fort Worth, in the county of Tarrant and State of Texas, have invented certain new and useful Improvements in Land-Breaking Plows, of which the following is a specification.

My invention relates to plows, and more particularly to rotary drums which carry sub-soiling and breaking plows; and the object is to provide plows which can be used to break the land to any desirable depth in any kind of soil without turning over the soil.

The object is to prepare the land so that the moisture will go down in the ground and be conserved and remain there for use in dry weather, and also to let the air down deep into the earth, depositing the nitrogen for a plant food. In order to make a success with such plows, it is necessary that scrapers be provided which will constantly operate on the peripheries of the drums to keep the dirt from clinging to the drums and choking the plows. Means must be provided for preventing the breaking of the plows in case of accidents, as by rocks or stones which may be encountered by the plows. In order to prevent breaking in such cases, the scraper carriers must be made yieldable when extraordinary strain comes against the scrapers and their beams.

The invention herein described is disclosed in one form of my pending application, filed Nov. 18, 1912, Ser. No. 731,951, for land breaking plows.

Other objects and advantages will be fully explained in the following description and the invention will be more particularly pointed out in the claims.

Reference is had to the accompanying drawings which form a part of this application.

Figure 1 is a side elevation of a plow drum, showing the scraper and devices for holding and adjusting the scrapers to the drum. Fig. 2 is a plan view of the scraper and its beam. Fig. 3 is a vertical section, taken on the line *x—x* of Fig. 2. Fig. 4 is a side elevation, similar to but a variation from the scraper shown in Fig. 1. Fig. 5 is a plan view of the same, showing two drums and the scraper in position.

Similar characters of reference are used to indicate the same parts throughout the several views.

The plow is provided with drums 1 which are mounted on a shaft 2 which is journaled in a frame 3. The drums are provided with plows 4 arranged approximately radially therein and curved toward the outer ends. The object of the scrapers is to keep the peripheries of the drums clear of dirt and the scrapers operate on the drums on each side of the plows 4. The scrapers 5 are mounted on beams which are preferably two bars 6 of channel iron and a bar 7 which is pivotally connected to and between the bars 6 by a pivot bolt 8. The bar 7 is also attached to the bars 6 by a pivot bolt 8. The bar 7 is also attached to the bars 6 by a breakable or frangible pin 9. The bar 7 is pivotally connected to a standard composed of two bars 10 which have a number of holes for different adjustments of the bar 7. The standard 10 has an adjustable section 11 at the upper end to which a chain 12 is attached. The beam 7 is normally held in operative position by the chain 12 and by reason of the projection of the parts 6 between the drums 1. The scraper supporting beams will be held against lateral displacement by the drums so that in case the scraper is struck by a rock or other object, the scraper cannot be thrown or crowded over against the plows 4. The scraper 5 is held in the proper position against the periphery of the drum by a roller 13 which bears against the hub 14 of the drum. This roller 13 will prevent friction of the scraper against the drum 1. The scrapers keep the dirt removed from the drums except between the plows 4. The space not scraped by the scrapers is small and not enough dirt will accumulate thereon to hinder the plowing. In case of extraordinary strain, as by a rock or stone coming against the scraper or beam 6, the beam 6 and the beam 7 will break the pin 9 and allow the beams to swing upwardly on the pivot bolt 8 and thus the breaking of the scraper or other elements is prevented. The chains 12, being flexible, will not hinder the upward swing of the scraper supporting beams. The roller 13 is mounted in a standard 15 which is bolted to the beams 6. The standards 10 are bolted to the frame 3 by angular extensions 16.

The variation shown in Figs. 4 and 5 contains scrapers 17. Bars or brackets 19 are attached to a beam 18 rigidly and these bars 19 have horizontal flanges bent thereon to which the scraper 17 is attached. Yokes 20 are rigidly attached to the bars 19 and these yokes engage the hubs 14 of the drums 1 loosely. The bar 18 is secured to the bars 19 by wooden pins 21 so that in case of accident these pins will break so that other elements will not be broken.

The scrapers which are adjacent to the side frames of the machine may be pivoted on brackets 22 which are attached to the frame. Such scraper 23 is shown in Fig. 5. The scrapers perform an additional function. Any large lumps of dirt that may be thrown up by the plows will be broken or pulverized by the scrapers.

What I claim, is,—

1. In a rotary drum plow, a scraper comprising a blade, a beam carrying the blade against the peripheries of the drums and pivoted at the other end to the frame of the plow, and a flexible member for holding said beam in operative position and for permitting said beam to break upwardly and to swing upwardly in case of accident.

2. In a rotary drum plow, a scraper comprising a blade, a beam pivoted at one end to the plow frame and carrying the blade at the other end in close proximity to the peripheries of the drums, means for holding said beam in operative position, and means for maintaining said blade in operative position relative to the peripheries of the drums.

3. In a rotary drum plow, a scraper comprising a blade, a beam pivoted at one end to the plow frame and carrying the blade at the other end, means for holding said beam in operative position, and means for holding said blade in operative relation relative to the peripheries of the drums consisting of a roller and a standard attached to said beam carrying said roller and holding the same against the hubs of the drums.

4. In a rotary drum plow, a scraper comprising a blade, a beam pivoted at one end and carrying said blade near the other end and consisting of two parts connected together by a pivot bolt and a frangible pin, said blade being carried by said beam in close proximity to the peripheries of the plow drums, and means for holding said beam in operative position.

5. In a plow provided with rotary drums, scrapers for cleaning the peripheries of the drums, beams supporting said scrapers in close proximity to the peripheries of the drums, each beam being pivotally connected to the plow frame at one end and projecting between two drums at the other end, and a flexible member supporting each beam.

6. In a rotary drum plow, a scraper comprising a blade, a standard attached to the plow frame, a breakable beam pivoted at one end to said standard and carrying the blade at the other end in close proximity to the peripheries of the drums, and a chain attached to said standard and to the central portion of said beam.

In testimony whereof, I set my hand in the presence of two witnesses, this 16th day of January, 1914.

ARTHUR REED.

Witnesses:
A. L. JACKSON,
J. W. STITT.